UNITED STATES PATENT OFFICE.

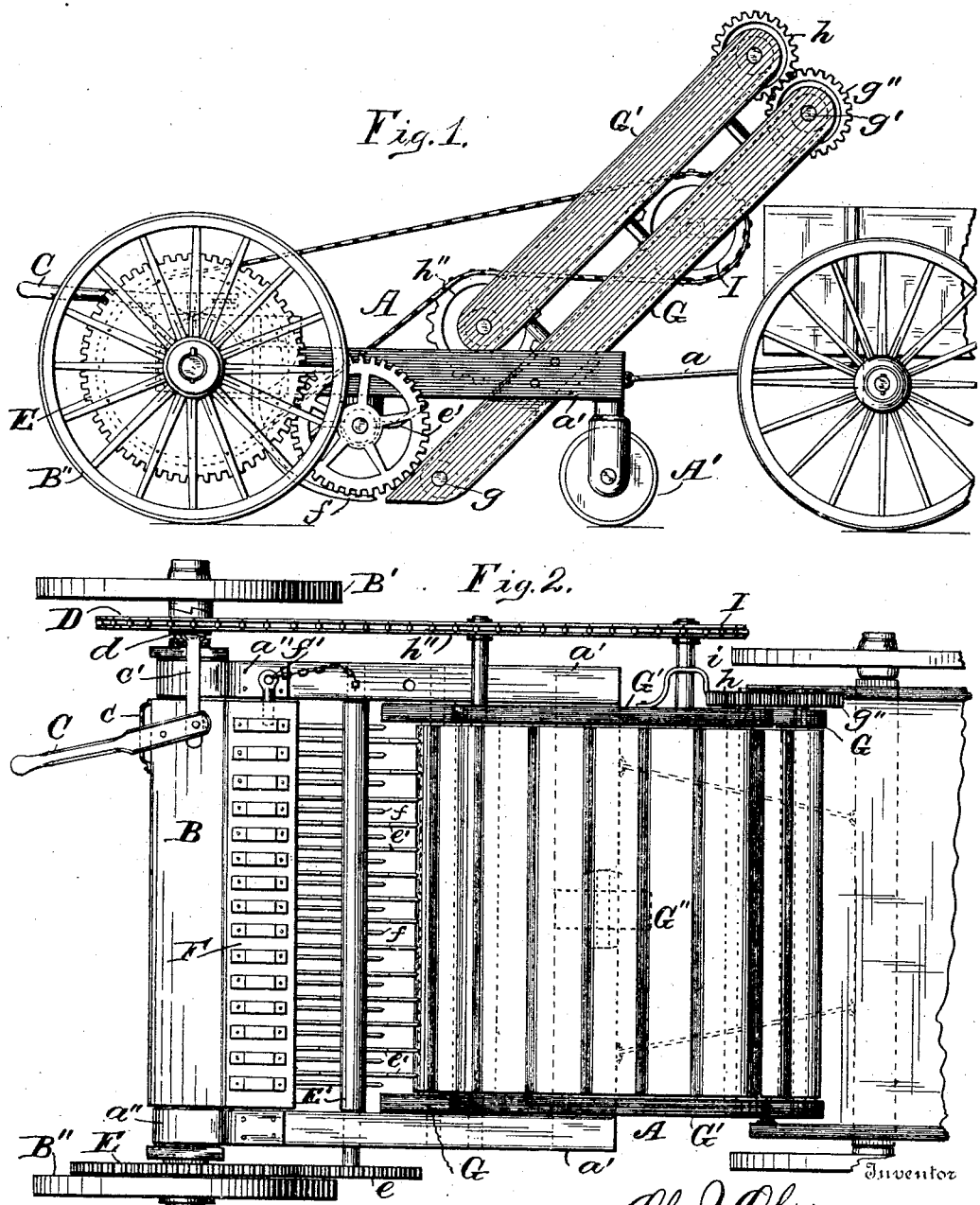

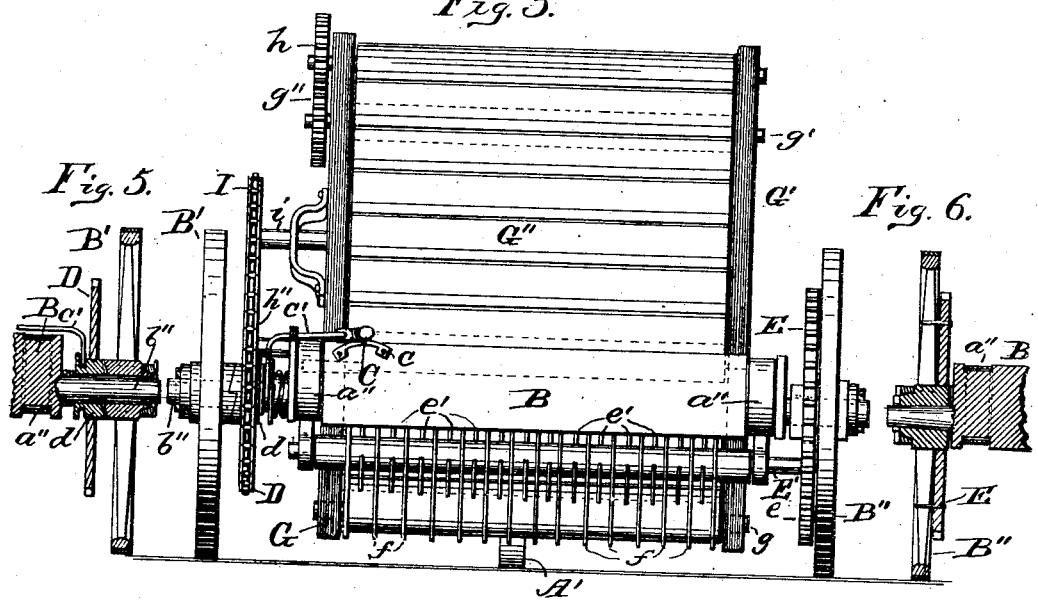

OLE J. OLSON, OF FERO, NORTH DAKOTA, ASSIGNOR OF ONE-HALF TO HANS C. ROMFO, OF FERO, NORTH DAKOTA.

HAY RAKE AND LOADER.

939,157.      Specification of Letters Patent.      Patented Nov. 2, 1909.

Application filed June 19, 1907. Serial No. 379,802.

*To all whom it may concern:*

Be it known that I, OLE J. OLSON, a citizen of the United States of America, residing at Fero, in the county of Pierce and State of North Dakota, have invented certain new and useful Improvements in Hay Rakes and Loaders; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to that type of hay rakes and loaders which in use are connected to a wagon, in such a manner that the hay will be gathered and delivered into the wagon when the same is drawn across a field, and my invention consists in the particular construction and arrangement of parts which provides means whereby the rake may be readily placed in and out of operation and in the details of construction, as will be hereinafter set forth and specifically pointed out in the claims.

In the accompanying drawings which illustrate one form of my invention, Figure 1 is a side elevation of a hay-rake and loader embodying my improvements. Fig. 2 is a plan view. Fig. 3 is a rear elevation. Fig. 4 is a longitudinal section. Figs. 5 and 6 are detail sections taken vertically through the main supporting wheels, and Fig. 7 is a detail view of a modified form of locking pin, such as may be used to hold the rake elevated or out of operative position.

The main supporting frame A has its front transverse beam, beveled on its rear edge and to the underside of the beam there is attached a support for a caster-wheel A', and to the front side of the beam there are attached draft-bars $a$, $a$, which are used to connect the hay-rake and loader to the axle or other part of a wagon. The parallel side bars $a'$, $a'$, are each connected to an axle B by means of straps $a''$, $a''$, which lie in recesses formed in the axle, such recesses being eccentric to the spindles upon which are mounted the supporting wheels B' and B''.

The axle B is provided with a rack-plate $c$ the same being located adjacent to the end of the axle that carries the wheel B' and in front of the rack-plate there is pivoted a lever C, the forward end of the lever being provided with a bar $c'$ that engages with a slidable section $d$ that is mounted upon the spindle $b''$, and the slidable clutch section is normally held in engagement with the clutch face of the hub of the wheel B' by a spring located between the section $d$ and the end of the axle. The section $d$ of the clutch has rigidly attached thereto a sprocket-wheel D, about which is passed a chain that drives both of the endless hay elevators. The wheel B'' has securely attached thereto a gear-wheel E which meshes with a pinion $e$ on the end of a shaft E', carried by hangers attached to the side bars of the frame so as to depend therefrom, and the shaft E' is provided with teeth $e'$, the construction providing a lifting reel which is constantly driven, such reel being positioned to operate in front of the rake teeth and in the rear of the lower end of the longer and front endless elevator.

The axle B has secured to its front side a bar F, the length thereof being such that it will occupy a position between the side bars of the frame A, and the front of the rake-tooth-carrying-bar is cut away or shaped so that it will not interfere with the teeth of the lifting reel when the rake teeth $f$ are lowered. The bar F in one end preferably the end adjacent to the lever C is provided with a recess or aperture for the reception of a bolt or pin $f'$ which may be attached to one of the side bars of the frame A, and when the bolt or pin is placed in the aperture it will hold the rake-teeth raised or out of operative position. In practice the axle may be swung upon its spindles by depressing the rearward extending end of the lever C and when the lever is depressed the opening that receives the bolt or pin will be above the plane of the side bar of the frame and when the pin is placed in the recess to receive the same the rake teeth will be held raised and out of operative position. The pin or bolt $f'$ may be carried by a frame as shown in Fig. 7 of the drawings, or it may be attached to one of the side bars of the main frame by a chain as shown by Fig. 2, and when so attached a perforation will be made in the upper face of one of the side bars, to receive the pin when not used to hold the rake teeth out of operative position. The preponderance of weight in advance of the hubs of the supporting wheels tilts the axle so that when the holding pin or bolt is disengaged from the rake-tooth carrying bar the rake teeth will be lowered to gather the cut hay.

The elevator mechanism comprises two belt-carrying-frames G, G', the front frame G being bolted or otherwise secured to the main frame A, so that its lower end will terminate about on the same plane as the forward ends of the rake teeth when raised. The side pieces of the belt-carrying-frame G maintain horizontal rollers $g$ and $g'$ over which pass a slatted belt or elevator, and the upper roller $g'$ beyond one of the side pieces of the frame has fast thereon a gear wheel $g''$ that drives a similar gear-wheel $h$, on the upper roll about which is passed an upper and shorter belt G''. The frame G has rigidly attached thereto the upper belt carrying frame G' and the lower belt carrying frame has a suitably supported stub shaft $i$ upon which is loosely mounted a sprocket wheel I, and in line with such sprocket wheel the lower roller $h'$ has fixedly connected thereto a sprocket wheel $h''$. The drive chain for the hay-elevating belts engages the sprocket wheels D, I, and $h''$, the belts being driven so that their adjacent faces will be caused to travel upward to deliver the hay that is gathered by the rake upon the portion of the lower belt that depends below the frame A, the hay being carried upward and under the upper belt that holds the hay so that it will not be jolted or blown from the elevator. As the elevating belts are geared together they will move in unison, and it will be noted that the lower belt is in gear with and is driven from the upper endless carrier. The support that carries the guide sprocket wheel I, may be adjusted to take up any slack of the chain.

When it is desired to use the hay rake and loader it is made fast to the axle or body of a wagon, in such a manner that the upper ends of the elevator will extend over the wagon body, the bolt that holds the rake teeth elevated is drawn out of its socket to allow the axle to tilt so that the rake teeth will rest upon the ground, the lever C is then released and as the implement is drawn across the field it will adapt itself to the inequalities of the ground, the rake teeth gathering the hay, which is placed by the rapidly moving reel upon the elevator and is carried by the elevators to the wagon.

In a device constructed in accordance with my invention the reel and the elevators are maintained in the same relative position one to the other, and the rake teeth are self adjusting. The construction provides means whereby one of the main supporting or traction wheels drives the endless elevators, and the other supporting wheel will drive the reel, this feature is particularly desirable as it prevents the elevator becoming clogged and insures a regular and effective feed of the hay thereto. It will be noted that the frame is open above the reel so that any surplus of material will be lifted by the reel and thrown backward upon the rake teeth, this occurs when the hay is unusually thick in places and thin in others.

Having thus set forth my invention what I claim as new and desire to secure by Letters Patent, is:—

1. A hay rake and loader, comprising a frame having side bars and a cross bar provided with spindles, supporting and actuating wheels revoluble upon said spindles, means for maintaining the cross bar in swinging engagement with the side bars of the frame, rake teeth carried by said cross bar, an endless elevator mounted on the frame and provided with side portions that depend below the frame to maintain the elevator in front of the rake teeth, a reel between the rake teeth and the depending end of the elevator, means for driving the reel from one of the supporting wheels and means for driving the elevator from the other supporting wheel.

2. A hay rake and loader comprising a frame, a movable cross bar mounted in the rear portion of the frame, spindles that project from the ends of the cross bar, rake teeth which depend from the forward portion of the cross bar to be movable therewith, depending hangers attached to the side bars of the frame, a reel maintained forward of the rake teeth by said depending hangers, an elevator supported by the frame and provided with a portion that depends in front of the reel, wheels mounted to revolve on the spindles and means for driving the reel from one of the wheels and the elevator from the other wheel.

3. A hay rake and loader comprising a frame made up of longitudinal bars, loops at the rear ends of said bars, a cross bar maintained in swinging engagement with the loops, rake teeth carried by the forward portion of the cross bar, means for limiting the swinging movement of the cross bar to maintain the rake teeth out of operative position, hangers on the side bars of the frame, a reel journaled in said hangers, an elevator attached to the side bars of the frame the rear lower end of the elevator being maintained in front of the reel and independently driven means for actuating the reel and the elevator, substantially as shown.

OLE J. OLSON.

Witnesses:
 JOHN MARTINSON,
 OLE PERSON.